US010298006B2

(12) United States Patent
Kim (10) Patent No.: US 10,298,006 B2
(45) Date of Patent: May 21, 2019

(54) ENERGY STORAGE SYSTEM AND METHOD OF DRIVING THE SAME

(71) Applicant: Samsung SDI Co., Ltd., Yongin-si, Gyeonggi-do (KR)

(72) Inventor: Woo-Choul Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 866 days.

(21) Appl. No.: 14/677,862

(22) Filed: Apr. 2, 2015

(65) Prior Publication Data

US 2015/0288212 A1 Oct. 8, 2015

(30) Foreign Application Priority Data

Apr. 4, 2014 (KR) ........................ 10-2014-0040814

(51) Int. Cl.
*H02J 7/00* (2006.01)
*H02H 3/24* (2006.01)
*H02J 3/32* (2006.01)
*H02J 7/35* (2006.01)

(52) U.S. Cl.
CPC ............ *H02H 3/24* (2013.01); *H02J 7/0031* (2013.01); *H02J 3/32* (2013.01); *H02J 7/35* (2013.01); *Y10T 307/696* (2015.04)

(58) Field of Classification Search
CPC .... H01M 10/00; H01M 2/00; H01M 2200/00; H01M 10/482; H01M 2010/4271; H01M 10/425; H01M 10/4207; H01M 2/1077; H02J 7/00; B60L 11/00; B60L 11/1866; Y02T 10/00; Y02T 10/7005; Y02T 10/7061; Y02T 10/7055; G01R 31/00; Y02E 10/563; Y02E 10/566; Y02E 70/30; Y02E 10/763; Y10T 307/625; Y10T 307/62
USPC ......................................... 307/80
See application file for complete search history.

(56) References Cited

U.S. PATENT DOCUMENTS

2006/0139008 A1   6/2006  Park
2006/0220601 A1*  10/2006 Horii .................. B60L 1/02
                                                  318/139
2011/0298288 A1*  12/2011 Cho .................. H01M 10/465
                                                  307/70

(Continued)

FOREIGN PATENT DOCUMENTS

KR   10-2006-0059680 A   6/2006
KR   10-2013-0049880 A   5/2013

*Primary Examiner* — Rexford Barnie
(74) *Attorney, Agent, or Firm* — Knobbe Martens Olson & Bear LLP (57) ABSTRACT

An energy storage system and method of driving the same are disclosed. In one aspect, the energy storage system comprises a battery system, a direct current (DC) contactor, first and second power supply units, and a first switch. The battery system includes at least one battery rack and at least one rack battery management system (BMS). The DC contactor is located between the battery system and a power conversion system. The first power supply unit is configured to be electrically connected to the DC contactor. The second power supply unit electrically connected to the rack BMS. The first switch is electrically connected to the rack BMS, wherein the rack BMS is configured to electrically disconnect the DC contactor from the first power supply unit when the first switch is turned on.

18 Claims, 5 Drawing Sheets

(56) References Cited

U.S. PATENT DOCUMENTS

| | | | | |
|---|---|---|---|---|
| 2012/0043819 A1* | 2/2012 | Kang | ................ | H02J 3/32 |
| | | | | 307/80 |
| 2012/0183813 A1* | 7/2012 | Kim | ................ | H01M 10/425 |
| | | | | 429/7 |
| 2012/0280662 A1* | 11/2012 | Krauer | ................ | H02J 7/04 |
| | | | | 320/138 |
| 2013/0113430 A1 | 5/2013 | Kim | | |

* cited by examiner

ENERGY STORAGE SYSTEM AND METHOD OF DRIVING THE SAME

INCORPORATION BY REFERENCE TO ANY PRIORITY APPLICATIONS

The present application claims priority to and the benefit of Korean Patent Application No. 10-2014-0040814, filed on Apr. 4, 2014, in the Korean Intellectual Property Office, the entire contents of which are incorporated herein by reference in their entirety.

BACKGROUND

Field

The described technology generally relates to an energy storage system and a method of driving the same.

Description of the Related Technology

Due to environmental problems, resource exhaustion, and the like, there is an increasing demand for a system capable of efficiently using stored power. Also, there is an increasing demand for new, renewable energy that minimizes pollution during power generation. An energy storage system is a system that connects new, renewable energy, a battery system storing power and existing grid to one another. Much research is being conducted to conform to environmental changes.

The energy storage system can include a power conversion system that converts and supplies power of a battery system storing power, a battery system, a power generator and a grid.

A direct current (DC) contactor can be coupled between the battery system and the power conversion system electrically connected to a high current terminal. The DC contactor can be a switch that controls supply of power. The DC contactor can be a switch through which an electrical energy having a high voltage, a high output passes through at all times, which can require separate supply of power.

Such power supply to the DC contactor controls charge/discharge of a plurality of battery racks included in the battery system and can be controlled by the rack battery management system (BMS) which monitors the status of each battery rack.

SUMMARY OF CERTAIN INVENTIVE ASPECTS

One inventive aspect is an energy storage system and a method for driving the same, comprising blocking connection between a battery system and a power conversion system when there is a problem with the battery system, and performing internal monitoring of a battery rack through a rack BMS without interruption.

Another aspect is an energy storage system that can include a battery system including at least one battery rack having at least one rack BMS, a DC contactor coupling a high current path between the battery system and a power conversion system, a first power supply unit coupled to the rack BMS, a second power supply unit coupled to the DC contactor and a first switch coupled to the rack BMS, wherein the rack BMS blocks connection between the DC contactor and the second power supply when the first switch is turned off.

The energy storage system can further include a second switch coupled to the path between the DC contactor and the second power supply unit.

The rack BMS can turn off the second switch when the first switch is turned on.

The second switch can be a transistor.

The rack BMS can output a control signal for controlling the second switch.

The control signal can be generated as a gate on voltage while the second switch is being turned on and as a gate off voltage while the second switch is being turned off.

The rack BMS can output the control signal such that the second switch is turned off when the first switch is turned on. The rack BMS can output the control signal such that the second switch is turned on when the first switch is turned off.

The first switch can be a manual switch.

A fuse can be further connected on the path between the DC contactor and the battery system.

The first power supply or the second power supply can be a switched-mode power supply SMPS.

Another aspect is a method for driving an energy storage system, including a battery system having at least one battery rack and a rack BMS monitoring the battery rack and a DC contactor connecting a high current path between the battery system and a power conversion system, includes receiving an ON/OFF signal of a first switch coupled to the rack BMS and controlling power supply of the DC contactor using the ON/OFF signal, wherein the controlling of the power supply blocks power supplied to the DC contactor from a first power supply unit when the ON/OFF signal is a turn-on signal and supplies the power of the first power supply unit to the DC contactor when the ON/OFF signal is a turn-off signal, wherein the rack BMS is supplied power from a second power supply unit.

Another aspect is an energy storage system, comprising a battery system, a DC contactor, first and second power supply units, and a switch. The battery system includes at least one battery rack and at least one rack battery management system (BMS). The DC contactor is located between the battery system and a power conversion system. The first power supply unit is configured to be electrically connected to the DC contactor. The second power supply unit is electrically connected to the rack BMS. The first switch is electrically connected to the rack BMS, wherein the rack BMS is configured to electrically disconnect the DC contactor from the first power supply unit when the first switch is turned on.

The above energy storage system further comprises a second switch located between the DC contactor and the first power supply unit. In the above energy storage system, the rack BMS is further configured to turn off the second switch when the first switch is turned on.

In the above energy storage system, the second switch comprises a transistor. In the above energy storage system, the rack BMS is further configured to output a control signal for controlling the second switch. In the above energy storage system, the control signal comprises one of: i) a gate on voltage when the second switch is on and ii) a gate off voltage when the second switch is turned off. In the above energy storage system, the rack BMS is further configured to i) turn off the second switch when the first switch is turned on and ii) turn on the second switch when the first switch is turned off.

In the above energy storage system, the first switch comprises a manual switch.

The above energy storage system further comprises a fuse located between the DC contactor and the battery system.

In the above energy storage system, at least one of the first and second power supply units comprises a switched-mode power supply (SMPS).

Another aspect is a method for driving an energy storage system, the method comprising receiving an ON/OFF signal of a first switch electrically connected to a rack BMS and controlling power supplied to a DC contactor based on the ON/OFF signal. The controlling comprises electrically disconnecting a first power supply unit from the DC contactor when the ON/OFF signal is a turn-on signal and electrically connecting the first power supply unit to the DC contactor when the ON/OFF signal is a turn-off signal, wherein the rack BMS receives power from a second power supply unit.

In the above method, the controlling further comprises turning off a second switch located between the first power supply unit and the DC contactor when the turn-on signal of the first switch is received and turning on the second switch when the turn-off signal of the first switch is received.

Another aspect is an energy storage system, comprising a battery system, a DC contactor, and first and second switches. The battery system includes at least one battery rack and at least one rack battery management system (BMS). The DC contactor is configured to electrically connect the battery system to a power conversion system. The first switch is electrically connected to the rack BMS. The second switch configured to electrically connect a power supply unit to the DC contactor. The rack BMS is configured to control the second switch.

In the above energy storage system, the rack BMS is further configured to turn off the second switch when the first switch is turned on.

In the above energy storage system, the second switch comprises a transistor. In the above energy storage system, the rack BMS is further configured to output a control signal for controlling the second switch, wherein the control signal comprises one of: i) a gate on voltage when the second switch is on and ii) a gate off voltage when the second switch is turned off.

In the above energy storage system, the rack BMS is further configured to turn off the second switch when the first switch is turned on and turn the second switch on when the first switch is turned off.

In the above energy storage system, the first switch comprises a manual switch.

The above energy storage system further comprises a fuse located between the DC contactor and the battery system.

In the above energy storage system, the power supply unit comprises a switched-mode power supply (SMPS).

The connection between the battery system and the power conversion system can be rapidly blocked when there is a problem with the battery system, and even when the connection is blocked, internal monitoring of the battery rack through the rack BMS can be carried out without any interruption.

DETAILED DESCRIPTION OF CERTAIN INVENTIVE EMBODIMENTS

Typically, when there is a problem with a battery system, in order to block connection between the battery system and a power conversion system, the power supplied to a rack BMS is blocked, and the rack BMS outputs a signal to turn off a DC contactor.

However, if the power supplied to the rack BMS is blocked to turn off the DC contactor, the rack BMS cannot monitor the inside of the battery rack.

Hereinafter, reference will now be made in detail to embodiments, examples of which are illustrated in the accompanying drawings. As used herein, the term "and/or" includes any and all combinations of one or more of the associated listed items. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 1:
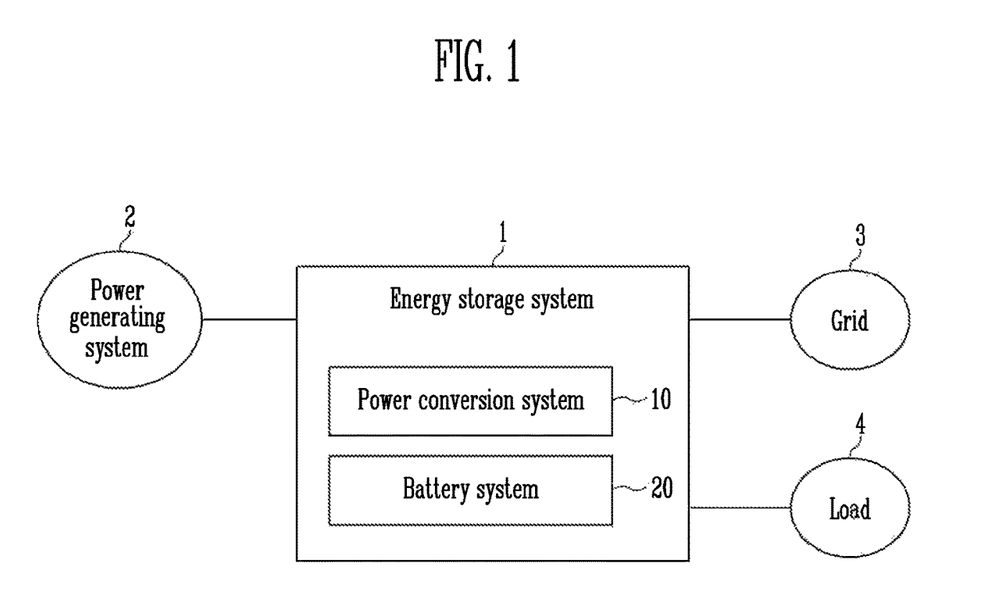
FIG. 1 is a schematic of an energy storage system and a peripheral configuration according to an embodiment.

FIG. 1 is a schematic of an energy storage system and a peripheral configuration according to an embodiment.

Referring to FIG. 1, the energy storage system 1 supplies power to a load 4 by linking with or electrically connecting to a power generating system 2 and a grid 3.

The power generating system 2 can generate power using an energy source. The power generating system 2 can supply the generated power to the energy storage system 1. The power generating system 2 can be a solar power generating system, a wind power generating system, a tidal power generating system, etc. However, the power generating system 2 is not limited to the above. The power generating system 2 can include any of the power generators using new, renewable energy to generate power such as solar heat, geothermal heat, etc. Particularly, a solar cell generating electrical energy using sunlight can be easily installed at family homes, factories, etc. and can be applied to the energy storage system 1 dispersed throughout each home or factory. The power generating system 2 can include a plurality of electricity generation modules in parallel and generate power by generation module, thereby making a high-capacity energy system.

A grid 3 can include a power plant, a substation, a power line, and the like. The grid 3, in a normal state, can supply power to the energy storage system 1, causing power to be supplied to the load 4 and/or a battery system 20 and receive power from the energy storage system 1. When the grid 3 is in an abnormal state, the energy storage system 1 stops supplying power to and receiving power from the grid 3.

The load 4 can consume power received from the power generating system 2, power stored in a battery system 20 or the power supplied from the grid 3. A family home, a factory or the like can be an example of the load 4.

The energy storage system 1 includes the battery system 20 that stores power and a power conversion system 10 that converts power received from the battery system 20, the power generating system 2 and the grid 3.

The energy storage system 1 can store the power generated from the power generating system 2 in the battery system 20 and supply the generated power to the grid 3. The energy storage system 1 can supply the power stored in the battery system 20 to the grid 3 or store the power supplied from the grid 3 in the battery system 20. The energy storage system 1 can also supply power to the load 4 by performing an uninterruptible power supply (UPS) operation when the grid 3 is in an abnormal state, for example, when there is a power outage. Furthermore, the energy storage system 1 can supply the power generated by the power generating system 2 or supply the power stored in the battery system 20 to the load 4 even when the grid 3 is in a normal state.

Figure 2:
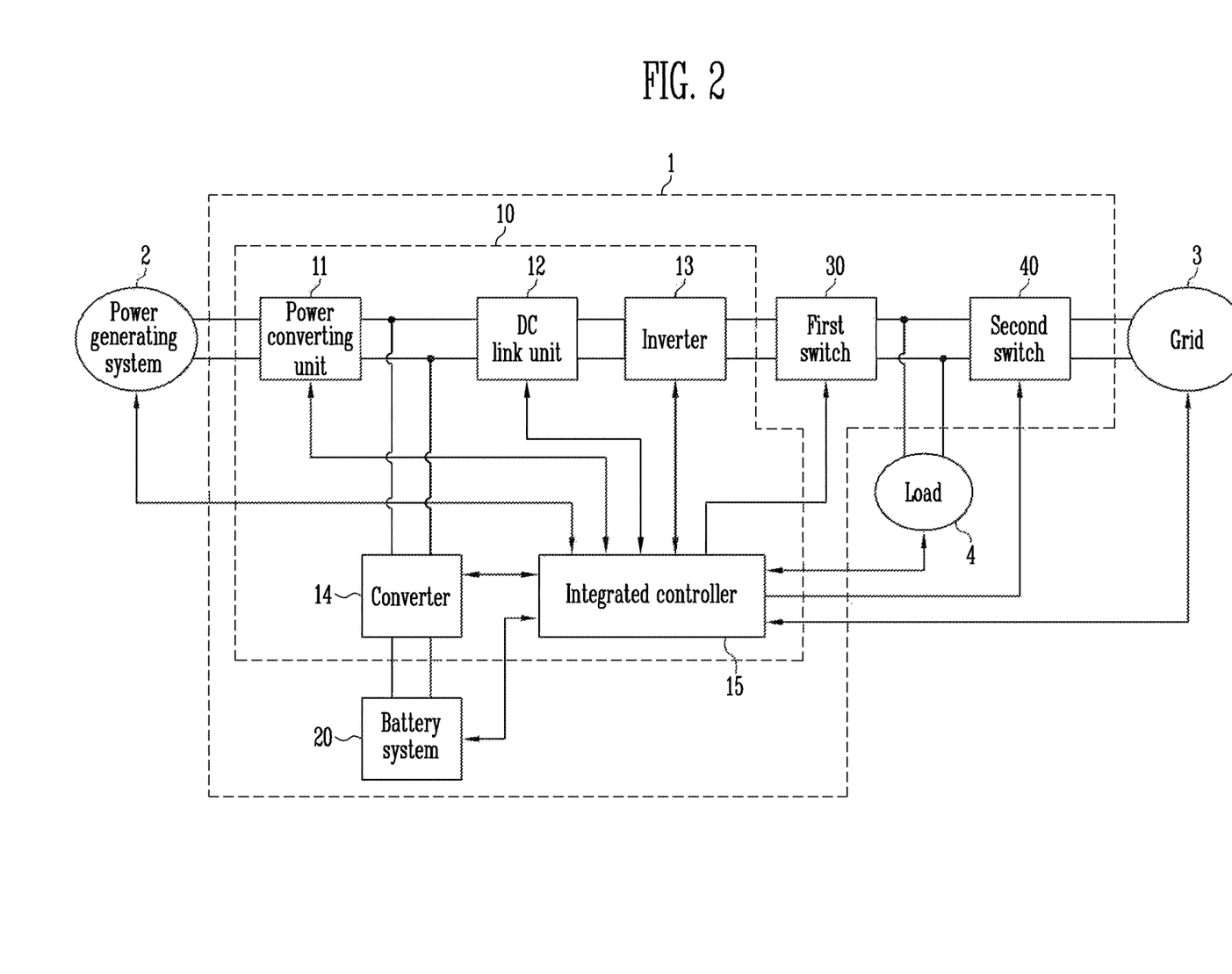
FIG. 2 is a block diagram illustrating a configuration of an energy storage system 1 according to an embodiment.

FIG. 2 is a block diagram illustrating a configuration of an energy storage system 1 according to an embodiment.

Referring to FIG. 2, the energy storage system 1 includes a power conversion system 10, a battery system 20, a first connecting switch 30, a second connecting switch 40, etc.

The power conversion system 10 can convert power supplied from a power generating system 2, a grid 3 and the battery system 20 into power suitable for the grid 3, the load 4 and the battery system 20. The power conversion system 10 can perform power conversion to and from an input/output terminal. The power conversion can be conversion between DC and alternating current (AC) and between a first voltage and a second voltage. The power conversion system 10 can supply the converted power to a predetermined destination based on an operation mode set by an integrated controller 15. The power conversion system 10 can include a power converting unit or power converter 11, a DC link unit 12, an inverter 13, a converter 14 and an integrated controller 15.

The power converting unit 11 can be a power converting device connected between the power generating system 2 and the DC link unit 12. The power converting unit 11 supplies power generated from the power generating system 2 to the DC link unit 12. An output voltage from the power converting unit 11 can be a DC link voltage.

The power converting unit 11 can be configured as a converter, a rectifier circuit, etc. depending on a type of the power generating system 2. When the power generated by the power generating system 2 is DC power, the power converting unit 11 can include a converter for converting a voltage level of the DC power of the power generating system 2 into a voltage level of the DC power of the DC link unit 12. However, when the power generated by the power generating system 2 is AC power, the power converting unit 11 can be a rectifier circuit for converting AC power into DC power. For example, when the power generating system 2 is a solar power generating system, the power converting unit 11 can include a maximum power point tracking (MPPT) converter. The MPPT converter can perform MPPT control so as to maximally obtain power generated by the power generating system 2 according to a change in solar radiation intensity, temperature, etc. The power converting unit 11 can stop operating so as to substantially minimize consumption of power when there is no power generated from the power generating system 2.

The DC link voltage can become unstable due to an instantaneous voltage drop in the power generating system 2 or the grid 3, a sudden change in the load 4, demand from high load, etc. However, the DC link voltage should be stabilized for stable operation of the converter 14 and the inverter 13. The DC link unit 12 can be connected between the power converting unit 11 and the inverter 13 and maintain the DC link voltage substantially steady. The DC link unit 12 can include, for example, a high-capacity capacitor, etc.

The inverter 13 can be a power converting device connected between the DC link unit 12 and the first connecting switch 30. The inverter 13 can include an inverter that converts a DC output voltage from the DC link unit 12 in a discharge mode into an AC voltage of the grid 3. The inverter 13 can also include the rectifier circuit rectifying the AC voltage of the grid 3, converting the AC voltage into the DC link voltage and outputting the DC link voltage to store power of the gird 3 in the battery system 20 in a charge mode. That is, the inverter 13 can be a bidirectional inverter that can change directions of an input and an output.

The inverter 13 can include a filter for removing harmonics from the AC voltage output to the grid 3, and can include a phase locked loop (PLL) circuit for synchronizing a phase of an AC voltage output from the inverter 13 with a phase of the AC voltage of the grid 3 so as to prevent reactive power loss. The inverter 13 can perform additional functions, e.g., restriction of a voltage variation range, improvement of a power factor, removal of a DC component, transient phenomenon protection, etc. The inverter 13 can stop operating to minimize consumption of power when it is not in use.

The converter 14 can be a power converting device connected between the DC link unit 12 and the battery system 20. The converter 14 can include a DC-DC converter for converting a voltage of power output from the battery system 20 in a discharge mode into the AC link voltage. The converter 14 can also include the DC-DC converter for converting a voltage of power output from the power converting unit 11 or the inverter 13 in a charge mode into a voltage for the battery system 20. That is, the converter 14 can be a bidirectional converter that can change directions of an input and an output. The converter 14 can stop operating to minimize consumption of power when the battery system 20 is being charged or when it is not being used for charging.

The integrated controller 15 can monitor the power generating system 2, the grid 3, the battery system 20 and the load 4 and control operations of the power converting unit 11, the inverter 13, the converter 14, the battery system 20, the first connecting switch 30 and the second connecting switch 40 based on monitoring results. The integrated controller 15 can monitor whether a blackout has occurred in the grid 3, whether power is generated from the power generating system 2, an amount of power generated by the power generating system 2, a charge status of the battery system 20, an amount of power consumption of the load 4, time, etc. The integrated controller 15 can also determine priority with respect to devices using power which are included in the load 4 and control the load 4 so as to provide power to devices having higher priority when, e.g., there is not enough power to be supplied to the load 4 due to a blackout in the grid 3.

The first connecting switch 30 and the second connecting switch 40 can be connected in series between the inverter 13 and the grid 3, perform ON/OFF operations according to the integrated controller 15, and control a current flow between the power generating system 2 and the grid 3. ON/OFF states of the first connecting switch 30 and the second connecting switch 40 can be determined according to statuses of the power generating system 2, the grid 3, and the battery system 20.

The first connecting switch 30 can be turned on so as to supply power of the grid 3 to the battery system 20 or so as to supply power of the power generating system 2 and/or the battery system 20 to the load 4. The second connecting switch 40 can be turned on so as to supply power of the power generating system 2 and/or the battery system 20 to the grid 3 or so as to supply power of the grid 3 to the load 4 and/or the battery system 20. A switching device such as a relay, etc., which can withstand a large current, can be used for the first connecting switch 30 and the second connecting switch 40.

When a power failure occurs in the grid 3, the second connecting switch 40 can be turned off so as to turn on the first connecting switch 30. In other words, power supplied to the load 4 is prevented from being flown to the grid 3 at when power is supplied to the load 4 from the power generating system 2 and/or the battery system 20. The energy storage system 1 prevents power from being supplied to the grid 3 by being cut off from the grid 3 where a power failure occurred. Thus, someone who is working with a power line of the grid 3 will not be shocked by power supplied from the energy storage system 1.

The battery system 20 can be supplied power of the power generating system 2 and/or the grid 3, store it and supply power stored in the load 4 or the grid 3. The battery system 20 can include a portion storing power and a portion controlling and protecting the battery system 20. The battery system 20 will be described in detail with reference to FIG. 3 below.

Figure 3:
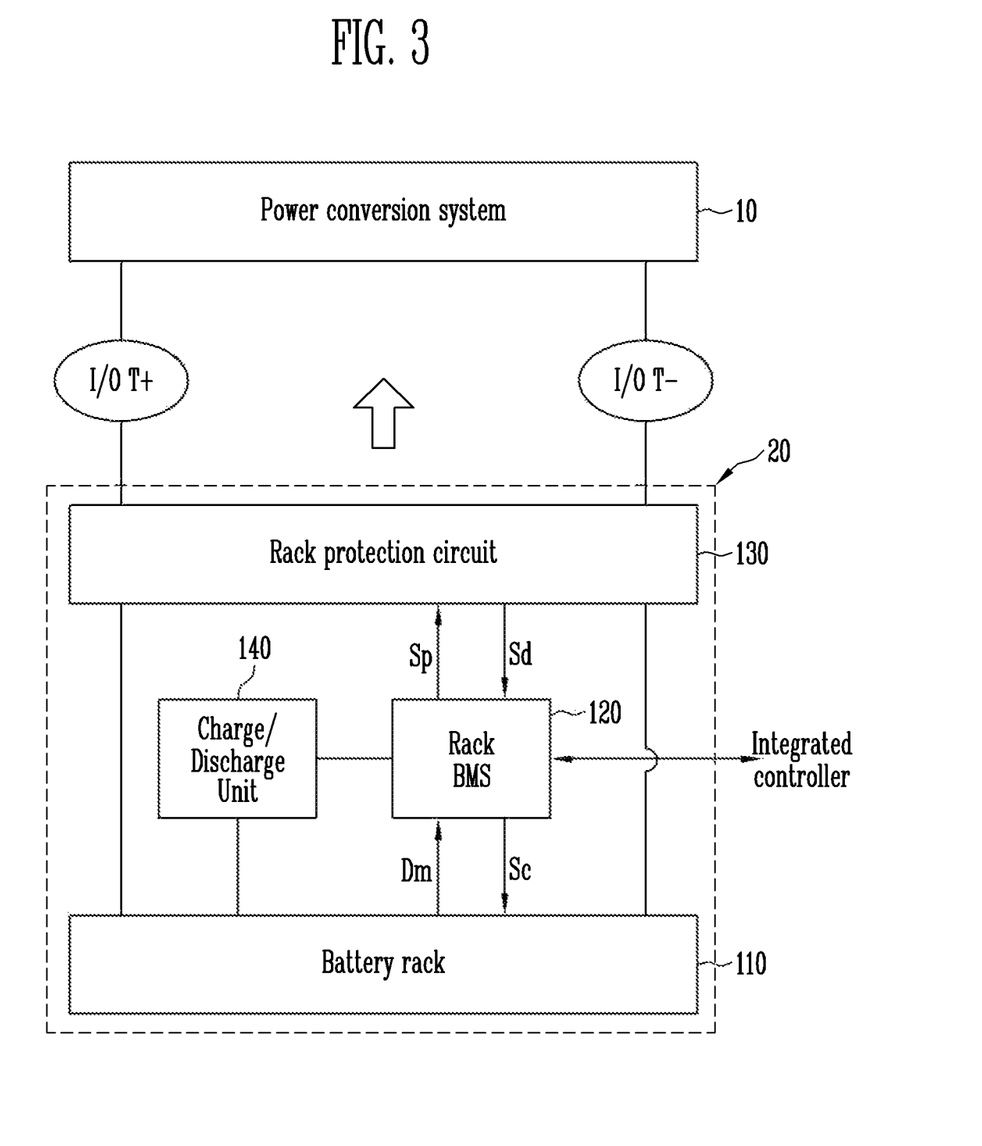
FIG. 3 is a view illustrating a configuration of a battery system according to an embodiment.

FIG. 3 is a view illustrating a configuration of a battery system according to an embodiment.

Referring to FIG. 3, the battery system 20 includes a battery rack 110, a rack BMS 120, a rack protection circuit 130 and a charge/discharge unit 140.

The battery rack 110 can receive and store power supplied from an external source, e.g., the power generating system 2 and/or the grid 3, and supply the stored power to the power generating system 2 and/or the grid 3. The battery rack 110 can include at least a battery tray connected in series and/or in parallel. Each battery tray can also include a plurality of battery cells. Various secondary batteries that can be charged can be used for the battery cells, which can include, for example, a nickel-cadmium battery, a lead battery, a nickel metal hydride (NiMH) battery, a lithium ion battery, a lithium polymer battery, etc.

The rack BMS 120 can be connected to the battery rack 110 and control charging and discharging operations of the battery rack 110 using a control signal Sf. The control signal Sf can be used for controlling a frequency transmitted from the integrated controller 15. The rack BMS 120 can also perform one or more of over-charge protection function, an over-discharge protection function, an over-current protection function, an over-voltage protection function, an over-heat protection function, and a cell balancing function, etc. For these functions, the rack BMS 120 can receive from the battery rack 110 monitoring data Dm regarding voltage, current, temperature, remaining amount of power, lifetime, charge status, state of charge (SOC), etc. of the battery cells in the battery rack 110. The rack BMS 120 can control the rack protection circuit 130 by generating the control signal Sc depending on monitoring results. Also, the rack BMS 120 can control the SOC of a second battery racks using the charge/discharge unit 140 so as to maintain the SOC steady. The rack BMS 120 can also supply the received monitoring data Dm to the integrated controller 15 and receive a command relating to a control of the battery rack 110 from the integrated controller 15.

The rack protection circuit 130 can be connected between the battery rack 110 and input/output terminals I/O T+, I/O T− connected to the converter 14. The rack protection circuit 130 can prevent damage to the battery rack 110. The rack protection circuit 130 can receive a control signal Sp from the rack BMS 120 and control a current flow depending on the control signal Sp. The rack protection circuit 130 can also measure an output voltage or an output current of the battery rack 110 and send a measurement signal Sd to the rack BMS 120. The rack protection circuit 130 can be physically separated from the rack BMS 120. The rack BMS 120 can be thus separated from the rack protection circuit 130 located in a high current path and the rack BMS 120 is thus protected from high current.

Figure 4:
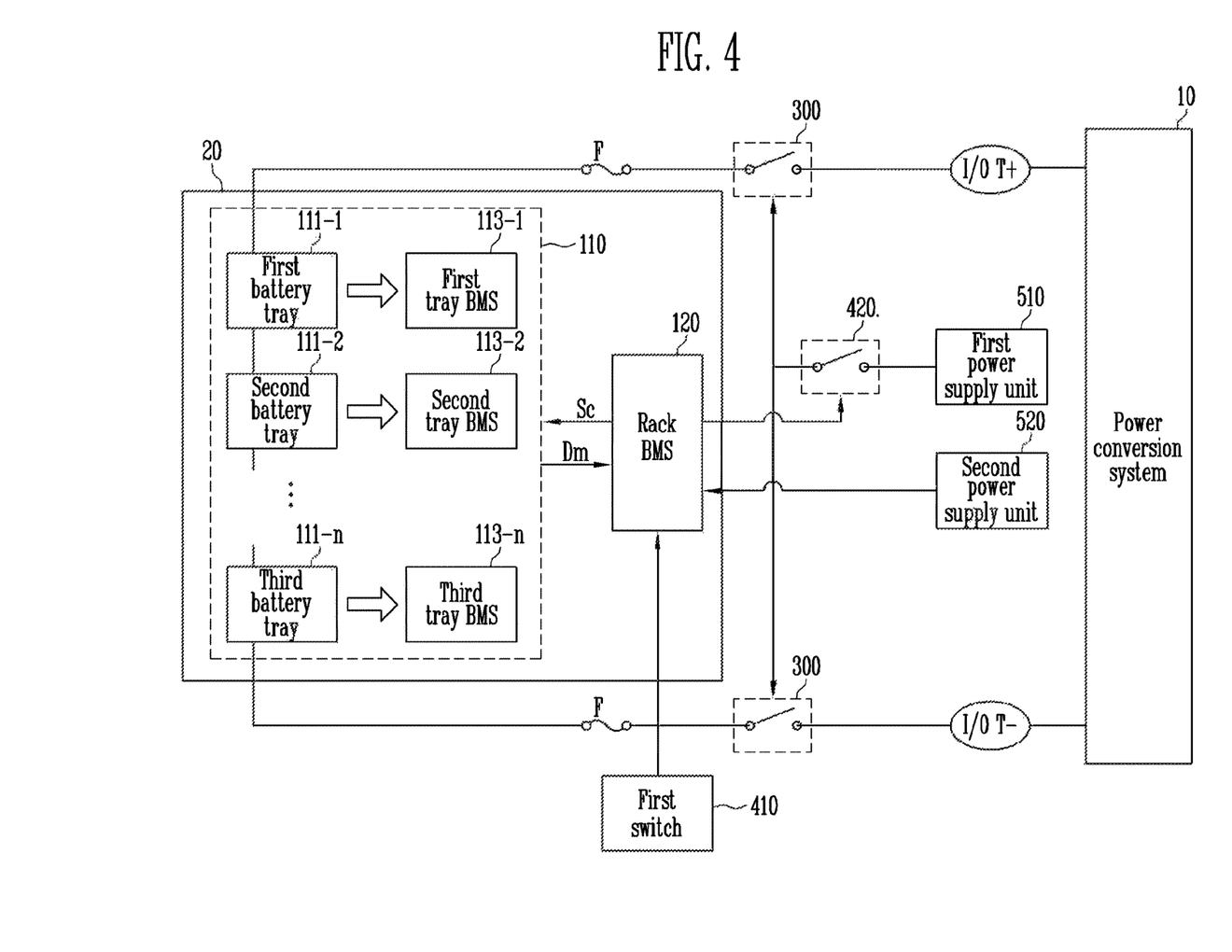
FIG. 4 is a view illustrating a connection relation between a battery system and a power conversion system according to an embodiment.

FIG. 4 is a view illustrating a connection relation between a battery system and a power conversion system according to an embodiment.

Referring to FIG. 4, the battery rack 110 includes at least one battery tray connected in series and/or parallel, i.e., a first battery tray to an nth battery tray 111-1 through 111-n. Each of the battery trays can also include a plurality of battery cells.

The battery rack 110 can control an output of the first battery tray 111-1 through the nth battery tray 111-n according to a control of the rack BMS 120 and output power through input/output terminals I/O T+, I/O T−.

The battery rack 110 includes a first tray BMS 113-1 through an nth tray BMS 113-n respectively corresponding to the first battery tray 111-1 through the nth battery tray 111-n. Each of the first tray BMS 113-1 through the nth tray BMS 113-n can receive a synchronization signal Sc from the rack BMS 120, and monitor a voltage, a current temperature, etc. of the corresponding battery trays 111-1 through 111-n. Monitoring results of the first tray BMS 113-1 through the nth tray BMS 113-n can be sent to the rack BMS 120.

A DC contactor 300 can be connected in a high current path between the battery system 20 and the power conversion system 10. The DC contactor 300 can be a switch controlling power supply, and a high voltage, high output electrical energy can pass through the DC contactor 300. Additional power can be supplied for driving the DC contactor 300.

Accordingly, a first power supply unit 510 can be connected to the DC contactor 300. A second power supply unit 520 supplying power can be additionally connected to the rack BMS 120.

The first and second power supply units 510 and 520 can be switching mode power supplies SMPS. The SMPS can be a modular power supply device for converting AC electricity which is supplied from commercial power into something suitable for various devices such as communications devices, home appliances, etc.

A first switch 410 is connected to the rack BMS 120. The first switch 410 can be a switch for blocking connection between the battery system 20 and the power conversion system 10 when there is a problem with the battery system 20. The first switch 410 can be a manual switch.

A user can activate the first switch 410 when there is an emergency situation to substantially block or electrically disconnect the connection between the battery system 20 and the power conversion system 10.

A second switch device 420 can be connected in a path between the first power supply unit 410 and the DC contactor 300 to electrically disconnect the battery system 20 from the power conversion system 10. The second switch 420 can be a switch controlling ON/OFF and controlled by the rack BMS 120.

The rack BMS 120 can control the second switch 420 to be turned off when the first switch 410 is turned on. The rack BMS 120 can control the second switch 420 to be turned on when the first switch 410 is turned off.

In some embodiments, the second switch 420 is a field effect transistor FET. The rack BMS 120 can output a control signal to control the second switch 420. The control signal can be a gate on voltage, when the second switch 420 is turned on, and a gate off voltage, when the second switch is turned off.

The rack BMS 120 can output the control signal so as to turn off the second switch when the first switch is turned on. The rack BMS 120 can output the control signal so as to turn the second switch on when the first switch is turned off.

When the second switch 420 is turned on, power can be supplied to the DC contactor 300 from the first power supply unit 510, the DC contactor 300 can be turned on, and the battery system 20 and the power conversion system 10 can be connected to each other.

When the second switch 420 is turned off, power supply to the DC contactor 300 by the first power supply unit 510 can be blocked, the DC contactor 300 can be turned off, and the battery system 20 and the power conversion system 10 can be electrically disconnected.

A power supply unit (not shown) supplying power to the DC contactor 300 and the rack BMS 120 can be included in each energy storage system 1. Therefore, when there is an emergency situation, the DC contactor 300 can be turned off Even when the the battery system 20 and the power conversion system 10 are electrically disconnected, the rack BMS 120 can substantially continuously monitor the battery rack 110.

A fuse F can be connected in a path between the contactor 300 and the battery rack 20. The fuse F can prevent damage to the DC contactor 300 when a current flowing through the DC contactor 300 increases.

Figure 5:
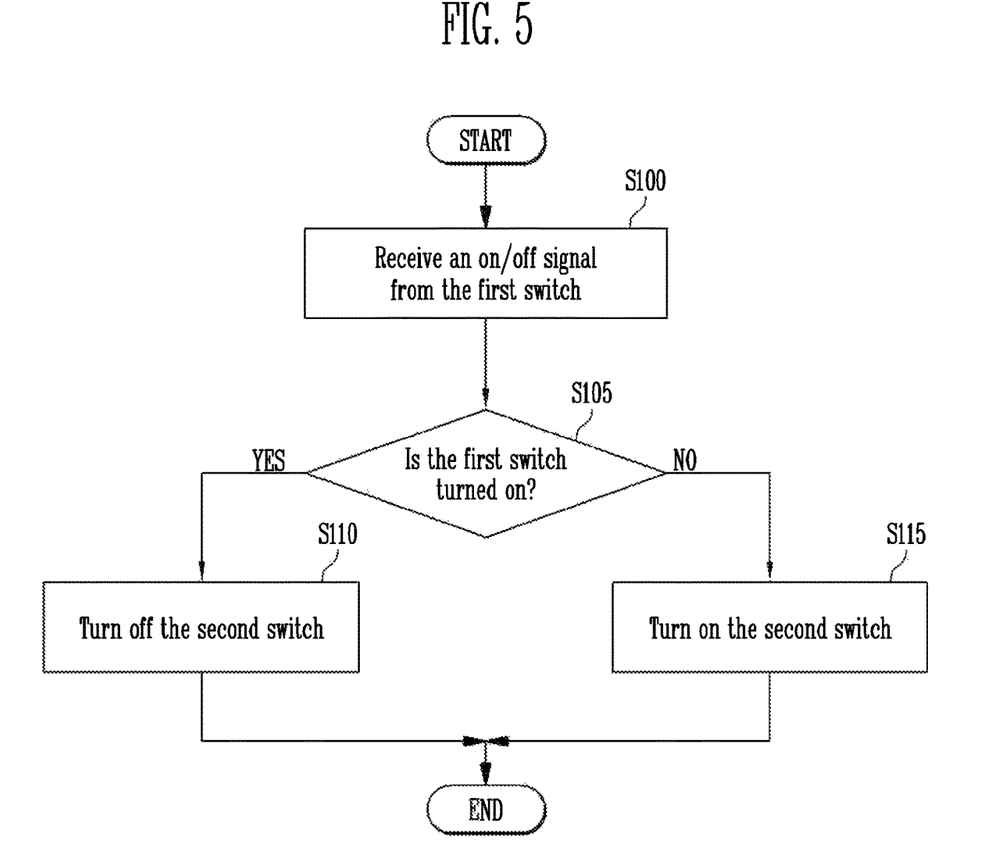
FIG. 5 is a diagram illustrating a method of driving an energy storage system according to an embodiment.

FIG. 5 is a diagram illustrating a method of driving an energy storage system according to an embodiment. Hereinafter, a method for controlling a rack BMS for blocking connection between a battery system and a power converting device according to an embodiment will be examined in connection with FIG. 4.

In some embodiments, the FIG. 5 procedure is implemented in a conventional programming language, such as C or C++ or another suitable programming language. The program can be stored on a computer accessible storage medium of the energy storage system 1, for example, a memory (not shown) of the energy storage system 1 or the integrated controller 15. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 5.

The rack BMS 120 receives an ON/OFF signal from a first switch 410. A user can turn on the first switch 410 when it is necessary to urgently block connection between a power conversion system 10 and a battery system 20 due to a battery system 20 error (S100).

The rack BMS 120 determines an ON/OFF status of the first switch 410 using an ON/OFF signal (S105).

If the ON/OFF signal is a turn-on signal for the first switch 410, the rack BMS 120 turns off a second switch 420 so as to substantially block power supplied to the DC contactor 300 from a first power supply unit 510 (S110).

In some embodiments, power which is divided is supplied to the rack BMS 120 and the DC contactor 300. Accordingly, even if power supplied to the DC contactor 300 is cut off, the rack BMS 120 can continue to receive power. As a result, the battery rack 110 can perform monitoring without interruption.

If the ON/OFF switch is a turn-off signal for the first switch 410, the rack BMS 120 turns on the second switch 420 so as to supply power of the first power supply unit 510 to the DC contactor 300 (S115).

The inventive technology has been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment can be used singly or in combination with features, characteristics, and/or elements described in connection with other embodiments unless otherwise specifically indicated. Accordingly, it will be understood by those of skill in the art that various changes in form and details can be made without departing from the spirit and scope of the present invention as set forth in the following claims.

What is claimed is:

1. An energy storage system, comprising:
a battery system including at least one battery rack and at least one rack battery management system (BMS);
a direct current (DC) contactor located between the battery system and a power conversion system;
a first power supply unit configured to be electrically connected to the DC contactor;
a second power supply unit electrically connected to the rack BMS; and
a first switch electrically connected to the rack BMS; and
a second switch located between the DC contactor and the first power supply unit, wherein the rack BMS is configured to electrically disconnect the DC contactor from the first power supply unit when the first switch is turned on, and
wherein the second switch comprises a transistor.

2. The energy storage system of claim 1, wherein the rack BMS is further configured to turn off the second switch when the first switch is turned on.

3. The energy storage system of claim 1, wherein the rack BMS is further configured to output a control signal for controlling the second switch.

4. The energy storage system of claim 3, wherein the control signal comprises one of: i) a gate on voltage when the second switch is on and ii) a gate off voltage when the second switch is turned off.

5. The energy storage system of claim 4, wherein the rack BMS is further configured to i) turn off the second switch when the first switch is turned on and ii) turn on the second switch when the first switch is turned off.

6. The energy storage system of claim 1, wherein the first switch comprises a manual switch.

7. The energy storage system of claim 1, further comprising a fuse located between the DC contactor and the battery system.

8. The energy storage system of claim 1, wherein at least one of the first and second power supply units comprises a switched-mode power supply (SMPS).

9. A method for driving an energy storage system, comprising:
receiving an ON/OFF signal of a first switch electrically connected to a rack BMS;

electrically connecting, via a second switch, a first power supply unit to a DC contactor, wherein the second switch is controlled by the rack BMS; and controlling power supplied to the DC contactor based on the ON/OFF signal, wherein the controlling comprises:
electrically disconnecting the first power supply unit from the DC contactor when the ON/OFF signal is a turn-on signal; and
electrically connecting the first power supply unit to the DC contactor when the ON/OFF signal is a turn-off signal,
wherein the rack BMS receives power from a second power supply unit.

10. The method of claim 9, wherein the controlling further comprises:
turning off the second switch when the turn-on signal of the first switch is received; and
turning on the second switch when the turn-off signal of the first switch is received.

11. An energy storage system, comprising:
a battery system including at least one battery rack and at least one rack battery management system (BMS);
a direct current (DC) contactor configured to electrically connect the battery system to a power conversion system;
a first switch electrically connected to the rack BMS; and
a second switch configured to electrically connect a power supply unit to the DC contactor,
wherein the rack BMS is configured to control the second switch.

12. The energy storage system of claim 11, wherein the rack BMS is further configured to turn off the second switch when the first switch is turned on.

13. The energy storage system of claim 11, wherein the second switch comprises a transistor.

14. The energy storage system of claim 13, wherein the rack BMS is further configured to output a control signal for controlling the second switch, and wherein the control signal comprises one of: i) a gate on voltage when the second switch is on and ii) a gate off voltage when the second switch is turned off.

15. The energy storage system of claim 14, wherein the rack BMS is further configured to turn off the second switch when the first switch is turned on and turn the second switch on when the first switch is turned off.

16. The energy storage system of claim 11, wherein the first switch comprises a manual switch.

17. The energy storage system of claim 11, further comprising a fuse located between the DC contactor and the battery system.

18. The energy storage system of claim 11, wherein the power supply unit comprises a switched-mode power supply (SMPS).

* * * * *